United States Patent
Ando et al.

(10) Patent No.: US 8,842,972 B2
(45) Date of Patent: Sep. 23, 2014

(54) IMAGE PROCESSING DEVICE AND IMAGE PROCESSING METHOD

(75) Inventors: Yuji Ando, Kanagawa (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/818,793

(22) PCT Filed: Aug. 25, 2011

(86) PCT No.: PCT/JP2011/069111
§ 371 (c)(1),
(2), (4) Date: Feb. 25, 2013

(87) PCT Pub. No.: WO2012/029615
PCT Pub. Date: Mar. 8, 2012

(65) Prior Publication Data
US 2013/0148944 A1 Jun. 13, 2013

(30) Foreign Application Priority Data
Sep. 3, 2010 (JP) ................................. 2010-197556

(51) Int. Cl.
*H04N 5/76* (2006.01)
*G11B 27/034* (2006.01)
*H04N 13/00* (2006.01)
*H04N 13/02* (2006.01)

(52) U.S. Cl.
CPC .......... *H04N 13/0007* (2013.01); *G11B 27/034* (2013.01); *H04N 13/0022* (2013.01); *H04N 2013/0081* (2013.01); *H04N 13/0239* (2013.01); *H04N 13/0048* (2013.01)
USPC ......................................................... 386/278

(58) Field of Classification Search
CPC .. G11B 27/034; G11B 2220/90; G11B 27/34; G11B 27/105; H04N 9/8042
USPC ........................................................... 386/278
See application file for complete search history.

(56) References Cited

U.S. PATENT DOCUMENTS

| | | | | |
|---|---|---|---|---|
| 2005/0271303 | A1* | 12/2005 | Simpson | 382/305 |
| 2007/0286289 | A1* | 12/2007 | Arai et al. | 375/240.26 |
| 2009/0244268 | A1* | 10/2009 | Masuda et al. | 348/51 |

FOREIGN PATENT DOCUMENTS

| | | |
|---|---|---|
| JP | 61-206395 | 9/1986 |
| JP | 08-009421 | 1/1996 |
| JP | 09-009295 | 1/1997 |
| JP | 2002-247604 A | 8/2002 |
| JP | 2004-104425 A | 4/2004 |

(Continued)

*Primary Examiner* — Thai Tran
*Assistant Examiner* — William Tran
(74) *Attorney, Agent, or Firm* — Wolf, Greenfield & Sacks, P.C.

(57) ABSTRACT

The present technology is related to an image processing device and image processing method that enables the generating of 3D images that can be viewed safely and comfortably. The communication unit acquires encoded data of 3D images, and the 3D image bitstream that includes at least the disparity information representing the disparity of these 3D images. The CPU specifies the playback timing of the 3D images. Based on the disparity information, the CPU determines the re-encoding section, which is the section of a front stream and back stream where adjustment of the disparity is needed, so that the difference between the disparity of 3D images of which the timings of playback are consecutive is at or below a predetermined threshold. The editing unit adjusts the disparity of the image data in the re-encoding section. The present technology is applicable, for example, to an editing device that edits 3D images.

6 Claims, 18 Drawing Sheets

(56) References Cited

FOREIGN PATENT DOCUMENTS

| JP | 2006-115246 A | 4/2006 |
| JP | 2008-109267 A | 5/2008 |
| JP | 2008-269460 A | 11/2008 |
| JP | 2009-055536 A | 3/2009 |
| JP | 2009-239388 A | 10/2009 |
| WO | WO 2010/067810 A1 | 6/2010 |

* cited by examiner

FIG. 3

| SHOOTING CONDITION INFORMATION | DISPARITY INFORMATION | ESTIMATED VIEWING ENVIRONMENT INFORMATION |
|---|---|---|
| UPPER LIMIT VALUE FOR THE BINOCULAR DISPARITY AMOUNT [PIXELS] | MAXIMUM BINOCULAR DISPARITY AMOUNT [PIXELS] | MAXIMUM SCREEN WIDTH [m] (FOR EXAMPLE, IT IS ASSUMED THAT THE MAXIMUM VALUE FOR THE BINOCULAR DISPARITY AMOUNT = 5 cm) |
| TIMESTAMP | MINIMUM BINOCULAR DISPARITY AMOUNT [PIXELS] | ESTIMATED DISTANCE BETWEEN THE EYES [m] (FOR EXAMPLE, 5 cm) |
| | BINOCULAR DISPARITY AMOUNT FOR THE MAIN VIEWING REGION [PIXELS] | |

FIG. 6

| SCREEN WIDTH [inches] | LENGTH CORRESPONDING TO 57 PIXELS [cm] |
|---|---|
| 20 | 1.3 |
| 30 | 2.0 |
| 40 | 2.6 |
| 50 | 3.3 |
| 60 | 3.9 |
| 70 | 4.6 |
| 80 | 5.3 |
| 100 | 6.6 |

SHOOTING RANGE AT THE CONVERGENCE POINT DISTANCE (HORIZONTAL)

FIG. 8

| FOCAL LENGTH (mm) | 14 | 20 | 24 | 28 | 35 | 50 | 85 | 100 | 105 | 135 | 180 | 200 | 300 | 400 | 500 | 600 | 800 |
|---|---|---|---|---|---|---|---|---|---|---|---|---|---|---|---|---|---|
| DIAGONAL LINE (°) | 114 | 95 | 84 | 75 | 63 | 47 | 29 | 24 | 23 | 18 | 14 | 12 | 8 | 6 | 5 | 4 | 3 |
| VERTICAL (°) | 81 | 62 | 53 | 46 | 38 | 27 | 16 | 14 | 13 | 10 | 8 | 7 | 5 | 3 | 3 | 2 | 2 |
| HORIZONTAL (°) | 104 | 84 | 74 | 66 | 54 | 40 | 24 | 20 | 20 | 15 | 11 | 10 | 7 | 5 | 4 | 3 | 3 |

FIG. 17

| SCREEN SIZE [inches] | SCREEN WIDTH [cm] | UPPER LIMIT FOR THE BINOCULAR DISPARITY AMOUNT = NUMBER OF PIXELS CORRESPONDING TO 5 cm | UPPER LIMIT FOR THE BINOCULAR DISPARITY AMOUNT = NUMBER OF PIXELS CORRESPONDING TO 6.5 cm |
|---|---|---|---|
| 20 | 44.3 | 217 | 282 |
| 30 | 66.4 | 145 | 188 |
| 40 | 88.6 | 108 | 141 |
| 50 | 110.7 | 87 | 113 |
| 60 | 132.8 | 72 | 94 |
| 70 | 155.0 | 62 | 81 |
| 80 | 177.1 | 54 | 70 |
| 100 | 221.4 | 43 | 56 |

IMAGE PROCESSING DEVICE AND IMAGE PROCESSING METHOD

CROSS-REFERENCES TO RELATED APPLICATIONS

The present application is the national phase of International Application No. PCT/JP2011/069111, titled "IMAGE PROCESSOR AND IMAGE PROCESSING METHOD," filed on Aug. 25, 2011, which claims the benefit of priority to Japanese Patent Application No. 2010-197556, titled "IMAGE PROCESSING APPARATUS AND IMAGE PROCESSING METHOD," filed with the Japanese Patent Office on Sep. 3, 2010. Each of these applications is hereby incorporated by reference in its entirety.

TECHNICAL FIELD

The present technology relates to an image processing device and image processing method, and more particularly relates to an image processing device and image processing method that enables generating of 3D images that can be viewed safely and comfortably.

BACKGROUND ART

For example, it has been proposed to add to 3D images, information for identifying 2D images and 3D images, and information of an imaging method to perform a suitable display. Also, it has been proposed to add a flag to 3D images, which represents images used in the display of 2D images, which are contained in the 3D images (Refer to PTL 1 for example).

Incidentally, when 3D images are commercial content, these 3D images are created during shooting and editing, by producers with consideration for safety and comfort when viewed.

Specifically, when the viewing environment is assumed to be a movie theater, producers assume the size of the screen in the movie theater, seat positions, and so forth, and create 3D images so that viewers can comfortably view 3D images in the movie theater. For example, as shown in FIG. 1, when the viewing environment is assumed to be a movie theater that has a screen with a predetermined screen width, producers shooting 3D movies so that the maximum binocular disparity amount is 1% of the screen width.

Now, in this way, if the 3D images shot so that the maximum binocular disparity amount is 1% of the screen width are then viewed at a movie theater with a screen installed that has a width where the width between the eyes of viewers is larger than 1% of the screen width, the binocular disparity amount of the 3D movies will become less than the width between both eyes of viewers with regard to what viewers can perceive. Therefore, a more comfortable viewing of 3D movies can be provided to viewers in these kinds of movie theaters.

For example, a more comfortable viewing experience can be provided if the width between both eyes of viewers is 5 cm, and the screen width is 226 inches (500 cm) or less. Also, a more comfortable viewing experience can be provided if the width between both eyes of viewers is 6.5 cm, and the screen width is 294 inches (650 cm) or less.

Also, when producers are editing 3D images for commercial content, the binocular disparity is adjusted so that there are no sudden changes in binocular disparity amount before and after edited points, following editing.

As described above, when 3D images are commercial content, these 3D images are created during shooting and editing, by producers with consideration for safety and comfort when viewed, so a more comfortable viewing experience can be provided for the viewing environment assumed by the producers.

CITATION LIST

Patent Literature

PTL 1: International Publication No. WO 2010/067810

SUMMARY OF INVENTION

Technical Problem

Unfortunately, when 3D images are not commercial content, it is difficult for amateurs, who are not used to handling 3D images, to edit 3D images with consideration for safety and comfort when viewed.

Also, even when 3D images are commercial content, when performing special playback where the shooting timing is not continuous (for example, highlights playback, digest playback, skip playback, repeat playback, and so on), there are sudden changes in binocular disparity amount. This results in viewers experiencing discomfort and stress. Also, this may cause an issue with viewer safety.

The present technology takes this kind of situation into consideration, and it is an object thereof to enable the creation of 3D images that can be viewed safely and comfortably.

Solution to Problem

A first aspect of the present technology is an image processing device that includes an obtaining unit that obtains 3D image data and disparity information representing the disparity of the 3D image data; a determining unit that determines an adjustment section, which is a section required to adjust the disparity of 3D image data so that the difference in disparity of the 3D image data is at or below a predetermined threshold for the 3D data of which the timings of playback are consecutive; and an adjusting unit that adjusts the disparity of the 3D image data within the adjustment range determined by the determining unit.

An image processing method according to the first aspect of the present technology corresponds with the image processing device of the first aspect of the present technology.

With the first aspect of the present technology, 3D image data and disparity information representing the disparity of the 3D image data is obtained, the adjustment range, which is the range required to adjust the disparity of the 3D image data so that the difference in disparity of the 3D image data is at or below a predetermined threshold, for the 3D data of which the timings of playback are consecutive is determined based on the disparity information, and the disparity of the 3D image data within the adjustment range determined by the determining unit is adjusted.

A second aspect of the present technology is an image processing device that includes a detection unit that, using 3D image data, detects the disparity of the 3D image data; and a transmission unit that transmits the 3D image data and the disparity information representing the disparity of the 3D image data.

An image processing method according to the second aspect of the present technology corresponds with the image processing device of the second aspect of the present technology.

With the second aspect of the present technology, the disparity of the 3D image data is detected from the 3D image data, and the 3D image data and the disparity information representing the disparity of the 3D image data is transmitted.

Furthermore, the image processing device for the first aspect and the second aspect is realized through the execution of a computer program.

Also, the program to be executed on a computer for the realization of the image processing device for the first aspect and the second aspect is provided by transmission via a transmission medium, or by recording onto a recording medium.

Advantageous Effects of Invention

With the first aspect of the present technology, 3D images can be created that can be viewed safely and comfortably.

With the second aspect of the present technology, information can be transmitted, for the creation of 3D images that can be viewed safely and comfortably.

BRIEF DESCRIPTION OF DRAWINGS

FIG. 3 is a diagram illustrating an example of additional information.

FIG. 6 is a diagram illustrating the relationship between screen width and a length on the screen corresponding to 57 pixels.

FIG. 8 is a diagram illustrating the relationship between focal length and angle of view.

FIG. 17 is a diagram illustrating the relationship between screen width and the upper limit value for the binocular disparity amount.

DESCRIPTION OF EMBODIMENTS

[Embodiment]
[Configuration Example of an Embodiment of Shooting Device]

Figure 1:
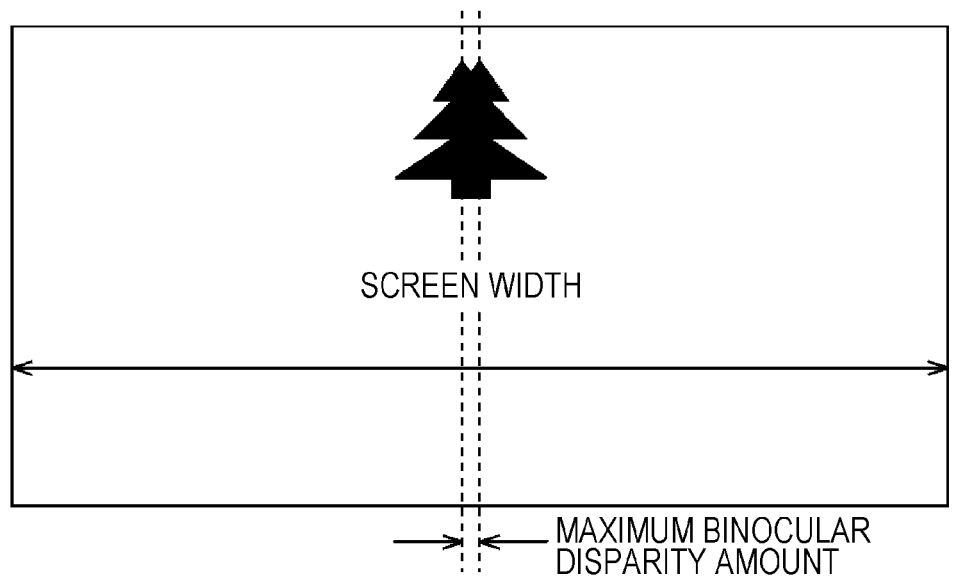
FIG. 1 is a diagram illustrating an example of the relationship between screen width and maximum binocular disparity amount.
Figure 2:
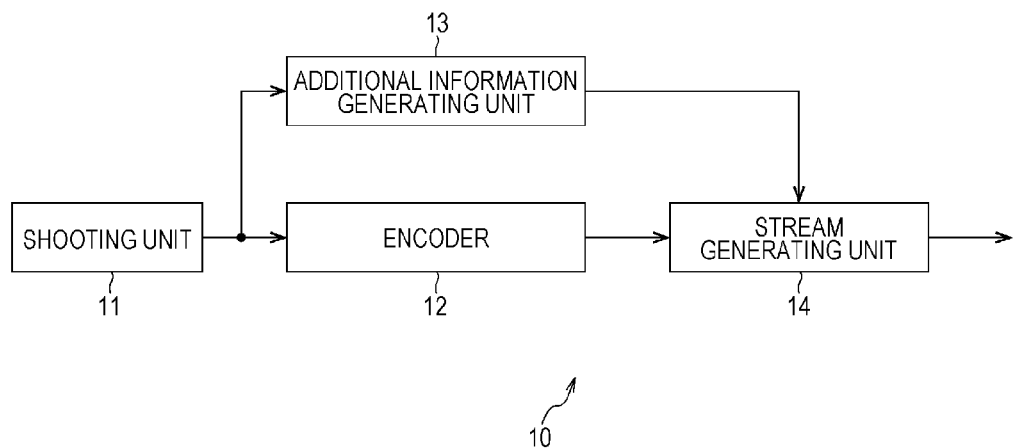
FIG. 2 is a block diagram illustrating an example configuration of an embodiment of a shooting device, as the image processing device to which the present technology is applied.

FIG. 2 is a block diagram illustrating an example configuration of an embodiment of a shooting device, as the image processing device to which the present technology is applied.

The shooting device 10 in FIG. 2 includes a shooting unit 11, an encoder 12, an additional information generating unit 13, and a stream generating unit 14. The shooting device 10 shoots and encodes 3D images, and then adds and outputs information and such representing the binocular disparity amount of these 3D images.

Specifically, the shooting unit 11 (shooting unit) of the shooting device 10 includes two cameras (not shown in the figure) arranged to line up horizontally so that the optical axes of the cameras are parallel. The two cameras each perform the shooting via the parallel method. The shooting unit 11 then selects one of the two images obtained as a result as the left image, and the other image becomes the right image. The shooting unit 11 shifts the left image and the right image to generate the 3D image, in which the position of depth is moved from infinity to the foreground.

Furthermore, an arrangement may be made instead where the shooting unit 11 does not shift the left image and right image shot via the parallel method, but rather generates 3D images by performing the shooting while applying an offset (shift shooting) between the lenses of the two cameras and the positional relationship of the image.

The shooting unit 11 supplies the generated 3D images to the encoder 12 and the additional information generating unit 13. Also, the shooting unit 11 supplies the 3D image shooting conditions, shooting timing, and similar to the additional information generating unit 13.

The encoder 12 (encoding unit) encodes the 3D images supplied from the shooting unit 11 in formats such as MVC (Multiview Video Coding), AVC (Advanced Video Coding), and MPEG2 (Moving Picture Experts Group phase 2). The encoder 12 supplies the encoded data, obtained as a result of the encoding), to the stream generating unit 14.

The additional information generating unit 13 generates the additional information, which is the information added to the encoded data, based on the 3D images, 3D image shooting conditions, and shooting timing supplied from the shooting unit 11, and on user input and such. The additional information includes, for example, such information as shooting condition information representing the shooting conditions of the 3D images, disparity information representing the binocular disparity amount of 3D images, and assumed viewing environment information representing the viewing environment where the 3D images are assumed to be viewed. The additional information generating unit 13 supplies the generated additional information to the stream generating unit 14.

The stream generating unit 14 (output unit) adds the additional information supplied from the additional information generating unit 13 to the encoded data supplied from the encoder 12, and generates a bitstream. At this time, the stream generating unit 14 may generate a bitstream by multiplexing the additional information into the corresponding encoded data, or it may generate a bitstream as file data different from the corresponding encoded data. The stream generating unit 14 outputs the generated bitstream.

[Description of Additional Information]

FIG. 3 is a diagram illustrating an example of the additional information.

In the example in FIG. 3, the additional information is configured from shooting condition information, disparity information, and assumed viewing environment information. The shooting condition information is configured from the upper limit value and timestamp for the binocular disparity amount. The upper limit value for the binocular disparity amount is the upper limit value of the binocular disparity amount of 3D images shot by the shooting unit 11, i.e. the binocular disparity amount at the point of infinity.

Furthermore, the binocular disparity amount is the number of pixels representing the amount of shift in the horizontal position between corresponding points in the left image and the right image that configure the 3D image. Here, when the right image is on the right side in contrast to the left image, i.e. when the depth position of the 3D image is in the background, the shift amount becomes a positive value; and when the right image is on the left side in contrast to the left image, i.e. the depth position is in the foreground, the shift amount becomes a negative value.

The upper limit value for the binocular disparity amount is for example, configured by the shooting unit 11, and input into the additional information generating unit 13, and then generated as the shooting condition information at the additional information generating unit 13.

Furthermore, instead of the actual upper limit value for the binocular disparity amount, a substitute parameter that can calculate the upper limit value for the binocular disparity amount may be included in the shooting condition information.

Also, the lower limit value for the binocular disparity amount may be included in the shooting condition information. The lower limit value for the binocular disparity amount is set at the shooting unit 11 in the same way as the upper limit value for the binocular disparity amount, where the shooting unit 11 shoots 3D images so that the lower limit value for the binocular disparity amount is the binocular disparity amount for 3D images that are in the front-most position. When the lower limit value for the binocular disparity amount is included in the shooting condition information, the shooting unit 11 inputs the lower limit value for the binocular disparity amount into the additional information generating unit 13, where the additional information generating unit 13 generates the lower limit value for this binocular disparity amount as shooting condition information.

The timestamp is the offset of the shooting timing for 3D images to which the shooting condition information is added, for the shooting timing of 3D images corresponding to this shooting condition information. This timestamp is generated based on the shooting timing and such input from the shooting unit 11.

Disparity information is configured from the maximum binocular disparity amount, the minimum binocular disparity amount, and the binocular disparity amount of the main viewing region. The maximum binocular disparity amount is the upper limit value for the binocular disparity amount of 3D images, and the minimum binocular disparity amount is the lower limit value for the binocular disparity amount of 3D images. Also, the main viewing region is the region of interest within the 3D image.

Furthermore, not only the maximum binocular disparity amount, the minimum binocular disparity amount, and the binocular disparity amount for the main viewing region, but information representing position within 3D images for these binocular disparity amounts may also be included in disparity information. The information representing this position may come from the coordinates of diagonal corners and upper left and lower right apexes of a rectangle including points within the 3D images that correspond to the binocular disparity amount, the central coordinates and radius of a circle that includes points within the 3D images that correspond to the binocular disparity amount, and so forth.

The maximum binocular disparity amount, minimum binocular disparity amount, and binocular disparity amount for the main viewing region are, for example, detected by the additional information generating unit 13 (detection unit) using 3D images, with techniques such as block matching or feature point extraction or the like, and then generated as disparity information.

Furthermore, the main viewing region may be determined by user input, or automatically detected. When the main viewing region is detected automatically, a region of key people may detected as the main viewing region, through a combination of face recognition and people recognition or similar, for example. Also, through a combination of image recognition to extract photographic subjects, image structure analysis, and scene recognition, a region of photographic subjects estimated to be of interest to viewers may be detected as the main viewing region, or a region of photographic subjects that include photographic subjects that are currently in focus, photographic subjects that are large in area, and photographic subjects with a modal value for the binocular disparity amount, i.e. a dominant binocular disparity amount, may be detected as the main viewing region.

Also, a flag may also be included in the disparity information to indicate whether the maximum binocular disparity amount, minimum binocular disparity amount, and binocular disparity amount for the main viewing area are enabled or disabled. In this case, the additional information generating unit 13 generates a flag indicating that the binocular disparity amount for the main viewing region is disabled in such events, for example, as when the shooting conditions for 3D images are predetermined conditions, when some kind of editing has been performed before being encoded by the encoder 12, or when an error occurs during detection of the binocular disparity amount.

The maximum screen width and estimated distance between eyes are generated as estimated viewing environment information. The maximum screen width is the maximum screen width in a viewing environment which the user assumes, and is the upper limit value for the screen width where the maximum binocular disparity amount will certainly be less than the estimated distance between the eyes. This upper limit value is generated by performing a calculation using the following Expression (1), which has an assumed predetermined value for the maximum binocular disparity amount (5 cm) from the additional information generating unit 13.

[Mathematical Expression 1]

$$\text{Screen width} = \frac{Horizontal\ resolution\ of\ \text{3D images}}{\text{Upper limit value for the binocular disparity amount}} \times Estimated\ distance \text{ between the eyes} \quad (1)$$

Furthermore, when the upper limit value for the actual binocular disparity amount is set as the upper limit value for the binocular disparity amount in Expression (1), if a photographic subject has an binocular disparity amount that is equal to this upper limit value for the binocular disparity amount, it is recommended to assume a larger value for the upper limit value for the binocular disparity amount actually set, as the binocular disparity amount of the photographic subject in this case cannot be made larger.

The estimated distance between the eyes is the distance between the eyes of the viewer estimated by the user. The estimated distance between the eyes is generated according to user input. Furthermore, the 3DC safety guidelines states that the average distance between the eyes for adults is 6.5 cm, and the distance between the eyes for children is 5 cm; and so it is recommended to set the estimated distance between the eyes to 5 cm in consideration of children viewers. Also, when standards dictate that the estimated distance between the eyes be a fixed value, the estimated distance between the eyes does not have to be generated as the estimated viewing environment information.

Furthermore, instead of the maximum screen width, a screen width input by the user, for which the user has estimated is appropriate for the viewing environment, may be included in the estimated viewing environment information.

Also, additional information may be generated for each frame of the 3D images for example. Furthermore, when the 3D images are encoding using MPEG2 or similar by the encoder 12, the additional information may be generated in increments of GOPs. In this case, the device that uses additional information (for example, the editing device discussed later) references the timestamp, and then generates additional information for each frame of the 3D images by interpolating the additional information generated in increments of GOPs of the 3D images, and uses this additional information.

Figure 4:
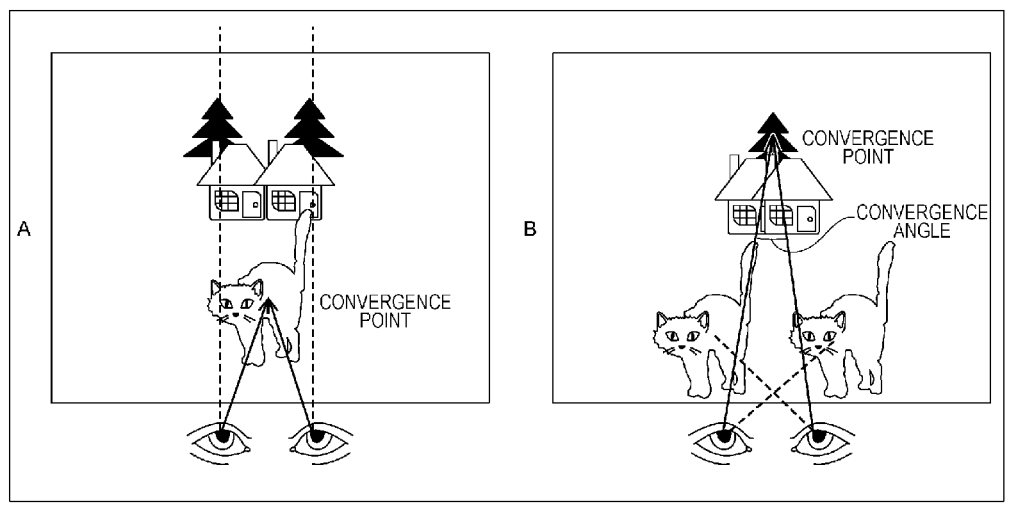
FIG. 4 is a diagram describing the setting of an upper limit value and a lower limit value for the binocular disparity amount.
Figure 5:
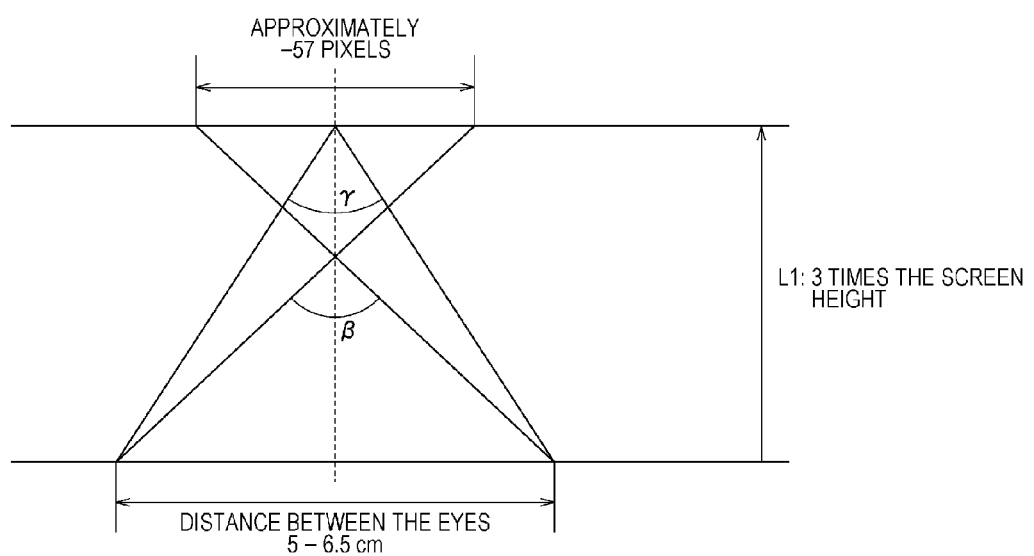
FIG. 5 is another diagram describing the setting of an upper limit value and a lower limit value for the binocular disparity amount.

FIG. 4 and FIG. 5 are diagrams describing the setting of an upper limit value for the binocular disparity amount and a lower limit value for the binocular disparity amount. Furthermore, in FIG. 4, the left image and right image are combined and displayed for clarification.

As shown in A of FIG. 4, human eyes rarely look to the side. Thus, the binocular disparity amount for 3D images that can be viewed safely and comfortably should be less than the distance between the eyes of viewers. However, if the screen width is large, this should be set to an acceptable range between 1 to 2%. This means that the upper limit value for the binocular disparity amount is set to the greater of the distance between the eyes of the viewers estimated by the user, and 1 to 2% of the screen width in the viewing environment estimated by the user.

Also, as shown in B if FIG. 4, the binocular disparity amount for 3D images that can be viewed safely and comfortably according to the 3D safety guidelines and such should be at least the binocular disparity amount where the convergence angle is one degree larger than the convergence angle at a binocular disparity amount of zero. Specifically, as shown in FIG. 5, when the distance between the eyes is between 5 to 6.5 cm, the viewing distance, which is the distance from the screen to the viewer's eyes, is the standard viewing distance, i.e. 3 times the screen height, the screen aspect ratio is 16:9, and the horizontal resolution is 1920 pixels; the binocular disparity amount for convergence angle β, which is the sum of convergence angle γ at a binocular disparity amount of zero plus one degree, is approximately 57 pixels. Thus, the lower limit value for the binocular disparity amount is set at approximately 57 pixels. FIG. 6 is a diagram illustrating the relationship between screen width and the corresponding screen length of 57 pixels.

Figure 7:
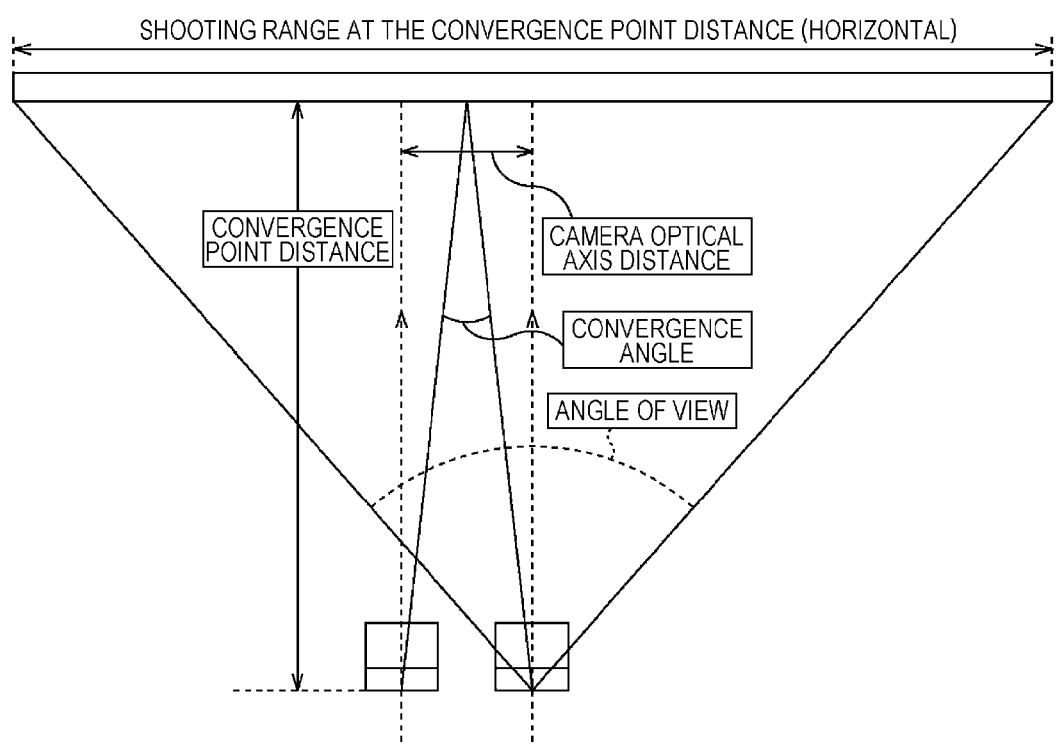
FIG. 7 is a diagram describing the relationship between the upper limit value of binocular disparity amount and shooting conditions.

Next, FIG. 7 describes the relationship between the upper limit value for the binocular disparity amount and shooting conditions for the shooting unit 11.

The upper value for the binocular disparity amount is represented by the following Expression (2), using the camera optical axis distance, shooting range at the convergence point distance, and the horizontal resolution of the 3D images, as shown in FIG. 7.

[Mathematical Expression 2]

$$\text{Upper limit value for the binocular disparity amount} = \frac{\text{Camera optical axis distance}}{\text{Capture range at the convergence point distance}} \times \text{Horizontal resolution} \quad (2)$$

Furthermore, the camera optical axis distance is the horizontal distance between the optical axes of the two cameras. Also, the shooting range at the convergence point distance is the horizontal range that can be shot by each camera when shooting, with the convergence point distance being the shooting range in which the two cameras shoot the convergence point which is the point at a binocular disparity amount of zero.

The convergence point distance is obtained by the following Expression (3), and the shooting range at the convergence point distance is obtained by the following Expression (4).

[Mathematical Expression 3]

$$\text{Convergence point distance} = \frac{\text{Camera optical axis distance}}{2} \times \tan\left(90 - \frac{\text{Convergence angle}}{2}\right) \quad (3)$$

[Mathematical Expression 4]

$$\text{Capture range at the convergence point distance} = 2 \times \text{Convergence point distance} \times \tan\left(\frac{\text{Angle of view}}{2}\right) \quad (4)$$

Furthermore, the convergence angle is the angle of the optical axes of the two cameras when shooting the convergence point by the two cameras. Also, the angle of view in Expression (4) is the angle of view for the shooting range at the convergence point distance. This angle of view is obtained by converting the convergence point distance to the focal length of a SLR (Single Lens Reflex) camera using 35 mm film, or a DSLR (Digital Single Lens Reflex) camera, and can then be obtained from the focal length and size of the image. FIG. 8 is a diagram illustrating the relationship between the angle of view and the focal length of a 35 mm half frame SLR camera, or a 35 mm full size DSLR camera.

As previously described, the relationship between the upper limit value for the binocular disparity amount and the camera optical axis distance is illustrated in Expression (2), and so when the upper limit value for the binocular disparity amount is set by the shooting unit 11, the camera optical axis distance is obtained by performing a calculation of the above Expression (2), using this upper limit value for the binocular disparity amount, shooting range at the convergence point distance, and the horizontal resolution. Also, the camera optical axis distance obtained here can be adjusted by the shooting unit 11.

Figure 9:
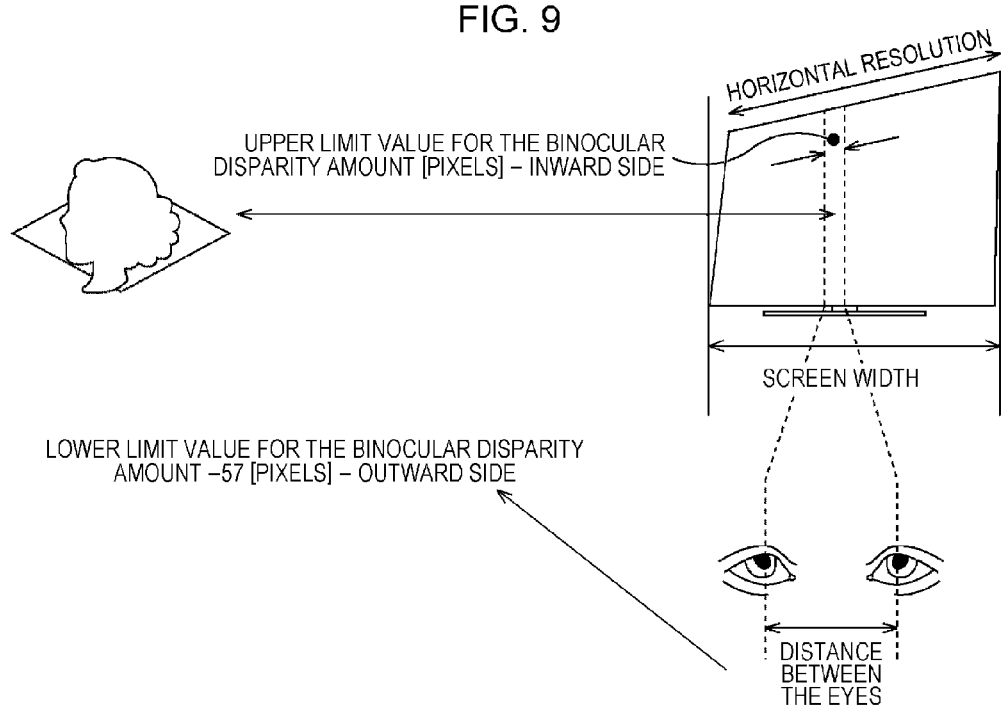
FIG. 9 is a diagram illustrating the relationship between the upper limit value for binocular disparity amount, the lower limit value for binocular disparity amount, horizontal resolution, screen width, and the space between the eyes.
Figure 10:
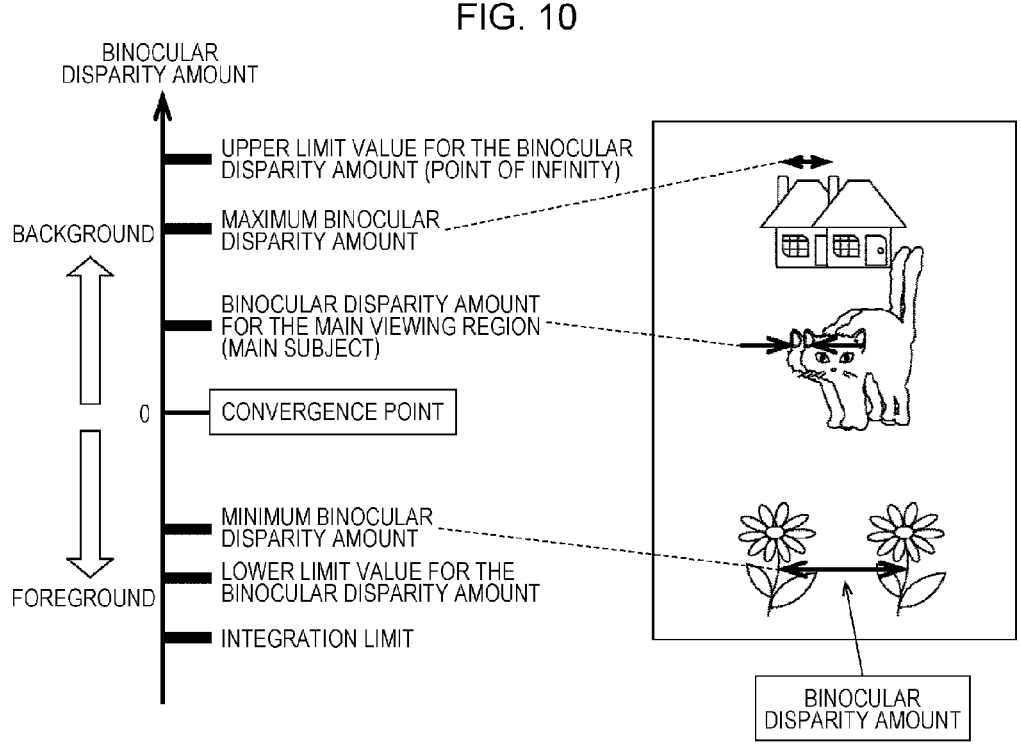
FIG. 10 is a diagram illustrating the relationship of binocular disparity amount.

FIG. 9 is a diagram illustrating the relationship between the upper limit value for the binocular disparity amount, the lower limit value for the binocular disparity amount, horizontal resolution, screen width, and the space between eyes. FIG. 10 is a diagram illustrating the relationship between the upper limit value for binocular disparity amount, the maximum binocular disparity amount, the binocular disparity amount for the main viewing region, the minimum binocular disparity amount, and the lower limit value for the binocular disparity amount.

[Description of Shooting Device Processing]

Figure 11:
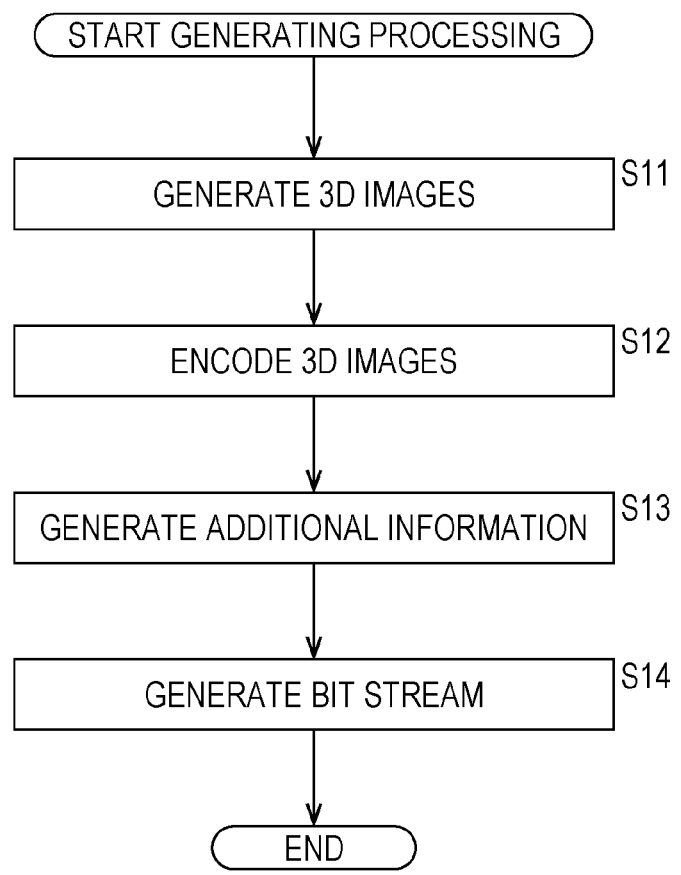
FIG. 11 is a flowchart describing generating processing by the shooting device in FIG. 2.

FIG. 11 is a flowchart describing generating processing by the shooting device 10 in FIG. 2. This generating processing is started, for example, when the user has instructed to shooting 3D images.

In step S11 of FIG. 11, the shooting unit 11 generates 3D images, and supplies this to the encoder 12 and the additional information generating unit 13. Also, the shooting unit 11 supplies the shooting conditions for 3D images and the shooting timing to the additional information generating unit 13.

In step S12, the encoder 12 encodes the 3D images supplied from the shooting unit 11 into the MVC, AVC, MPEG2, or another such format, and supplies the resultant encoded data to the stream generating unit 14.

In step S13, the additional information generating unit 13 generates the additional information, based on the 3D images, shooting conditions for the 3D images, and shooting timing supplied from the shooting unit 11, and user input. The additional information generating unit 13 supplies the generated additional information to the stream generating unit 14.

In step S14, the stream generating unit 14 encodes additional information supplied from the additional information generating unit 13, and generates a bitstream into the encoded data supplied from the encoder 12. Then processing terminates.

As described previously, the shooting device 10 detects disparity information using 3D images, and outputs this disparity information together with the encoded data. Thus, the device that performs playback or editing of the encoded data can generate 3D images that can be viewed safely and comfortably, based on the disparity information, and keeping the difference in the binocular disparity amount of 3D images of which the timings of playback are consecutive at or below a predetermined threshold value.

Also, as the disparity information is output together with the encoded data, the device that performs playback and editing of the encoded data does not have to decode the encoded data to get the disparity information. Thus, the device that performs playback and editing of the encoded data can generate 3D images that can be viewed safely and comfortably, by only decoding a range where binocular disparity amount needs to be adjusted during playback and editing to keep the difference in the binocular disparity amount of 3D images of which the timings of playback are consecutive at or below a predetermined threshold. As a result, the device that performs playback and editing of the encoded data can provide safe and comfortable 3D images to the viewer without much of an image processing load.

[Example Configuration of an Editing Device]

Figure 12:
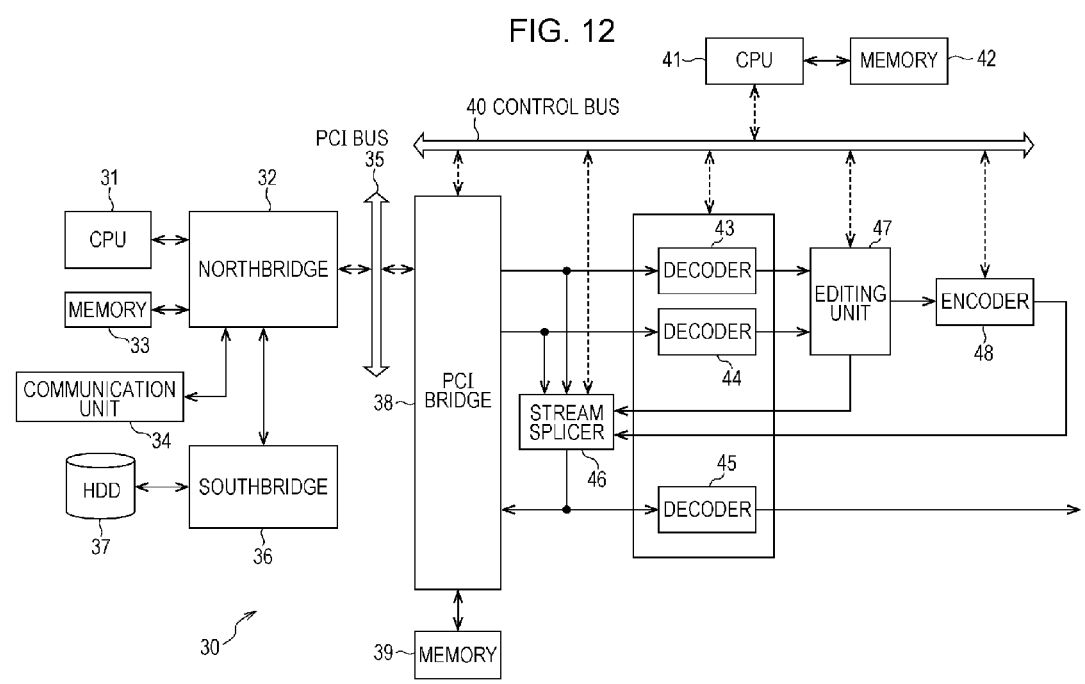
FIG. 12 is a block diagram illustrating an example configuration of an embodiment of an editing device, as the image processing device to which the present technology is applied.

FIG. 12 is a block diagram illustrating an example configuration of an embodiment of an editing device, as the image processing device to which the present technology is applied.

An editing device 30 in FIG. 12 performs editing of the 3D image bitstream output from the shooting device 10 in FIG. 2 so that the 3D images can be viewed safely and comfortably after editing, by only decoding the smallest range necessary for editing.

Specifically, a CPU (Central Processing Unit) 31 of the editing device 30 is connected to northbridge 32. For example, the CPU 31 controls the processing of such tasks as reading of data stored in an HDD (Hard Disk Drive) 37, and generates and outputs the command to control the editing processing executed by a CPU 41.

Northbridge 32 is connected to a PCI bus (Peripheral Component Interconnect/Interface) 35. For example, based on CPU 31 control, northbridge 32 receives a supply of data stored in the HDD 37 through southbridge 36, and then supplies this to memory 39 through PCI bus 35 and PCI bridge 38. Also, northbridge 32 is also connected to memory 33, and accepts data that the CPU 31 uses in its processing. Furthermore, northbridge 32 is also connected to a communication unit 34, and accepts data to communicate with other devices.

Memory 33 stores data necessary for processing executed by the CPU 31. Southbridge 36 controls writing and reading of data to/from the HDD 37. The communication unit 34 sends data supplied from northbridge 32 to other devices, and supplies data received from other devices to northbridge 32. The HDD 37 stores the 3D image bitstream received from the shooting device 10 as editable material.

PCI bridge 38 controls the reading and writing of data to/from memory 39. Also, PCI bridge 38 controls the supply of encoded data to decoders 43 through 45, the supply of additional information to the CPU 41, and the supply of the bitstream to stream splicer 46. Also, PCI bridge 38 controls the reception of data from PCI bus 35 and control bus 40.

Based on PCI bridge 38 control, the memory 39 stores the bitstream, which is editable material and read from the HDD 37, and the post-edit bitstream supplied from the stream splicer 46.

The CPU 41 controls processing executed by the PCI bridge 38, decoders 43 through 45, stream splicer 46, the editing unit 47, and the encoder 48, according to commands supplied from the CPU 31, and through the northbridge 32, the PCI bus 35, the PCI bridge 38, and the control bus 40. The memory 42 stores data necessary for the CPU 41 processing.

Based on CPU 41 control, the decoder 43 and the decoder 44 (decoding unit) decode encoded data supplied from PCI bridge 38 using a format compatible with the encoding format used by the encoder 12 in FIG. 2, and supplies the image data of the 3D images obtained as the decoding result to editing unit 47. The decoder 45 decodes and outputs the post-edit bitstream supplied from stream splicer 46 using a format compatible with the encoding format using by the encoder 12 and encoder 48.

Based on CPU 41 control, stream splicer 46 combines the bitstream supplied from PCI bridge 38 and the bitstream that includes the encoded data supplied from the encoder 48, and generates the post-edit bitstream. The stream splicer 46 supplies the post-edit bitstream to the decoder 45, and also supplies this to memory 39 to be stored, through the PCI bridge 38.

Based on control of the CPU 41, the editing unit 47 combines the image data of 3D images supplied from the decoder 43 or the decoder 44. At this time, the editing unit 47 (adjusting unit) adjusts the binocular disparity amount of the main viewing region for the image data of the 3D images so that the difference in the binocular disparity amount of the image data for the 3D images of which the timings of playback are consecutive is at or below a predetermined threshold. The editing unit 47 supplies the image data obtained as the combination result to encoder 48 as post-edit data.

Based on CPU 41 control, the encoder 48 encodes the post-edit data supplied from the editing unit 47 using the same encoding format used by the encoder 12, and then outputs the encoded data obtained as a result to the stream splicer 46.

Next, the operation of the editing device 30 will be described.

The communication unit 34 (obtaining unit) obtains the bitstream output from the shooting device 10, and supplies this to the northbridge 32. Based on CPU 31 control, the northbridge 32 supplies the bitstream supplied from the communication unit 34 through the southbridge 36, to the HDD 37, so as to be stored.

Depending on operation input from the user, which is supplied from an operation input unit not shown in the diagram, and CPU 31 control, the southbridge 36 reads of two bitstreams connected from the HDD 37 when editing, a front bitstream (hereafter, front stream) and a back bitstream (hereafter, back stream). The front bitstream and back bitstream that have been read are, based on CPU 31 control, supplied to the memory 39, through the northbridge 32, the PCI bus 35, and the PCI bridge 38, so as to be stored. Also, the CPU 31 (designating unit) supplies the information representing the edit points and commands representing the edit start to the CPU 41, through the northbridge 32, the PCI bus 35, the PCI bridge 38, and the control bus 40.

Furthermore, the information representing the edit points is the information representing the positions that connect previous frames and following frames to each other, and this information determines the playback timing for 3D images in the post-edit bitstream. Thus, the information representing the edit points is the information that specifies the playback timing of 3D images for the post-edit bitstream.

Based on the information representing the edit points supplied from the CPU 31 and the additional information included in the front stream and back stream, the CPU 41 (determining unit) determines the range of the front stream and back stream, as the re-encoding section, that necessary to adjust the binocular disparity amount so that the difference in the binocular disparity amount of the main viewing region for 3D images of which the timings of playback are consecutive is at or below a predetermined threshold.

Next, based on CPU 41 control, PCI bridge 38 supplies encoded data in the re-encoding section, and the encoded data necessary when decoding this encoded data, from the front stream stored in memory 39 to the decoder 43. Also, based on CPU 41 control, PCI bridge 38 supplies encoded data in the re-encoding section, and the encoded data that necessary when decoding this encoded data, from the back bitstream stored in memory 39 to the decoder 44.

Also, at this time, based on CPU 41 control, PCI bridge 38 supplies the part of the front stream not in the re-encoding section up to the edit point, and the part of the back stream not in the re-encoding section following the edit point, both of which are stored in the memory 39, to the stream splicer 46.

Based on CPU 41 control, the decoder 43 and the decoder 44 decode encoded data supplied from the PCI bridge 38 using a format compatible with the encoding format used by the encoder 12 in FIG. 2. The decoder 43 and the decoder 44 then supply the image data of 3D images in the re-encoding section obtained after decoding, to the editing unit 47.

Based on CPU 41 control, the editing unit 47 connects the image data of 3D images supplied from the decoder 43 with the image data of 3D images supplied from the decoder 44. Furthermore, at this time, based on CPU 41 control, the editing unit 47 adjusts the binocular disparity amount for the main viewing region of the image data of the 3D images of which the timings of playback are consecutive so that the difference in the binocular disparity amount for the main viewing region of the 3D images of which the timings of playback are consecutive is at or below a predetermined threshold. The editing unit 47 supplies the image data of connected 3D images to the encoder 48 as post-edit data.

Based on CPU 41 control, the encoder 48 encodes the post-edit data supplied from the editing unit 47 using the same format as the encoder 12 in FIG. 2. The encoder 48 supplies the encoded data obtained as a result to the stream splicer 46.

Based on CPU 41 control, the stream splicer 46 adds the additional information updated with the post-adjustment binocular disparity amount for the main viewing region to the encoded data supplied from the encoder 48, and generates the bitstream for the re-encoding section. Based on CPU 41 control, the stream splicer 46 connects the bitstream for generated re-encoding section with the bitstream supplied from the PCI bridge 38, and generates the post-edit bitstream.

Based on CPU 41 control, the stream splicer 46 then supplies the post-edit bitstream to PCI bridge 38 to be stored in memory 39. Also, based on CPU 41 control, the stream splicer 46 supplies the post-edit bitstream to the decoder 45 to be decoded, then to be displayed on a display or another device not shown in the figure.

When the post-edit bitstream has been instructed from the operation input unit, which is not shown in the figure, to be stored, based on CPU 31 control, the PCI bridge 38 reads the post-edit bitstream stored in the memory 39. Based on CPU 31 control, and through the PCI bus 35 and the northbridge 32, the post-edit bitstream that has just been read is supplied to the southbridge 36, which in turn supplies the bitstream to the HDD 37 to be stored.

[Description of Binocular Disparity Amount Adjustment]

Figure 13:
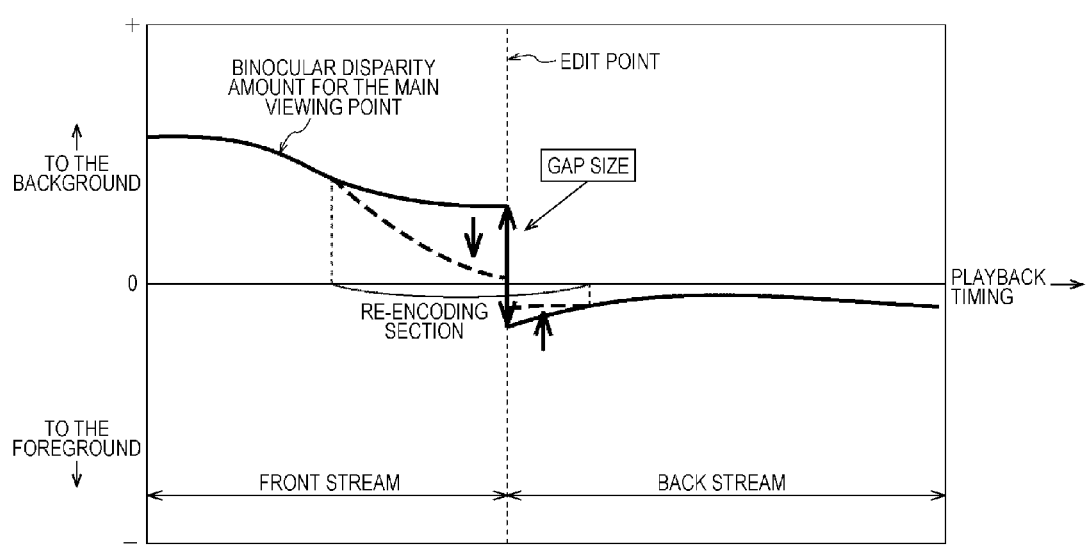
FIG. 13 is a diagram describing a determining method of the re-encoding section.

FIG. 13 is a diagram describing a method to determine the re-encoding section.

Furthermore, in FIG. 13, the horizontal axis represents the playback timing of 3D images, and the vertical axis represents the binocular disparity amount.

As shown in FIG. 13, when the difference (gap) between the binocular disparity amount for the main viewing region of the front stream that has an edit point where the shooting timing is not continuous, and the binocular disparity amount for the main viewing region of the back stream is more than a predetermined threshold, the CPU 41 obtains the binocular disparity amount for the main viewing region at an interval where the playback timing of the front stream is before the edit point, and the binocular disparity amount for the main viewing region at an interval where the playback timing of the back stream is after the edit point. The CPU 41 then determines the re-encoding section based on the binocular disparity amount for the main viewing region obtained from the front stream and the back stream.

Accordingly, while the binocular disparity amount for the main viewing region of the front stream and the back stream needs to be recognized to determine the re-encoding section, the editing device 30 does not have to decode the encoded data to detect the binocular disparity amount, as the binocular disparity amount for the main viewing area is added to the encoded data in the bitstream output by the shooting device 10. Therefore, by simply decoding the encoded data in the re-encoding section, the editing device 30 can adjust the binocular disparity amount so that the difference between the binocular disparity amount for the main viewing area of the 3D images of which the timings of playback are consecutive will be at or below a predetermined threshold.

Figure 14:
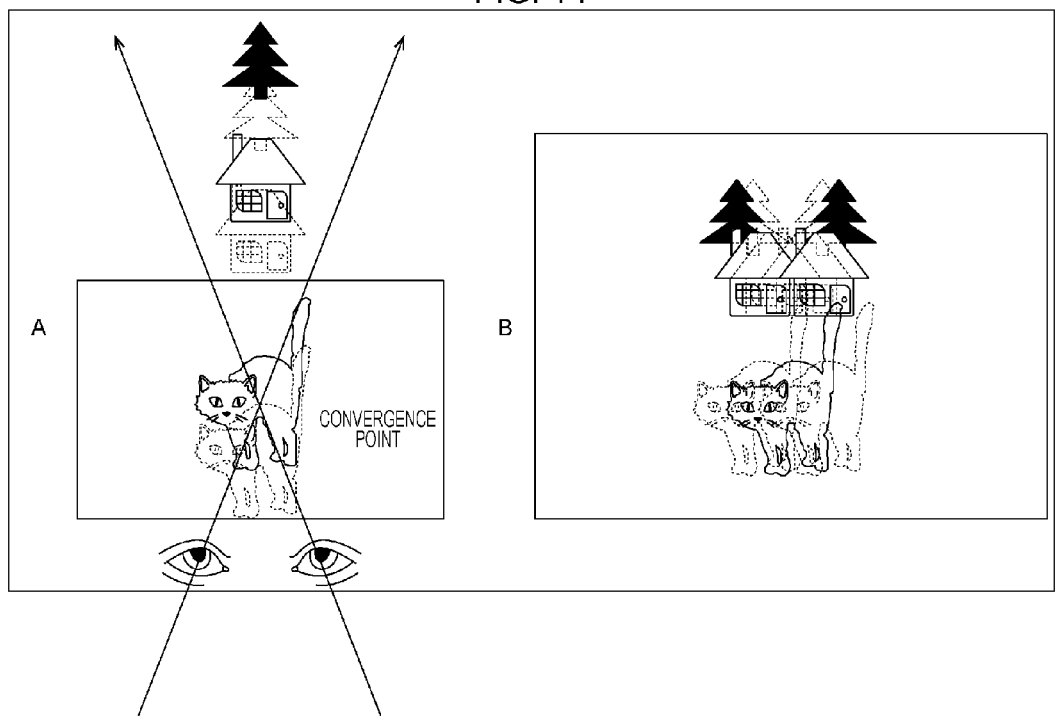
FIG. 14 is a diagram describing a first adjustment method for binocular disparity amount.
Figure 15:
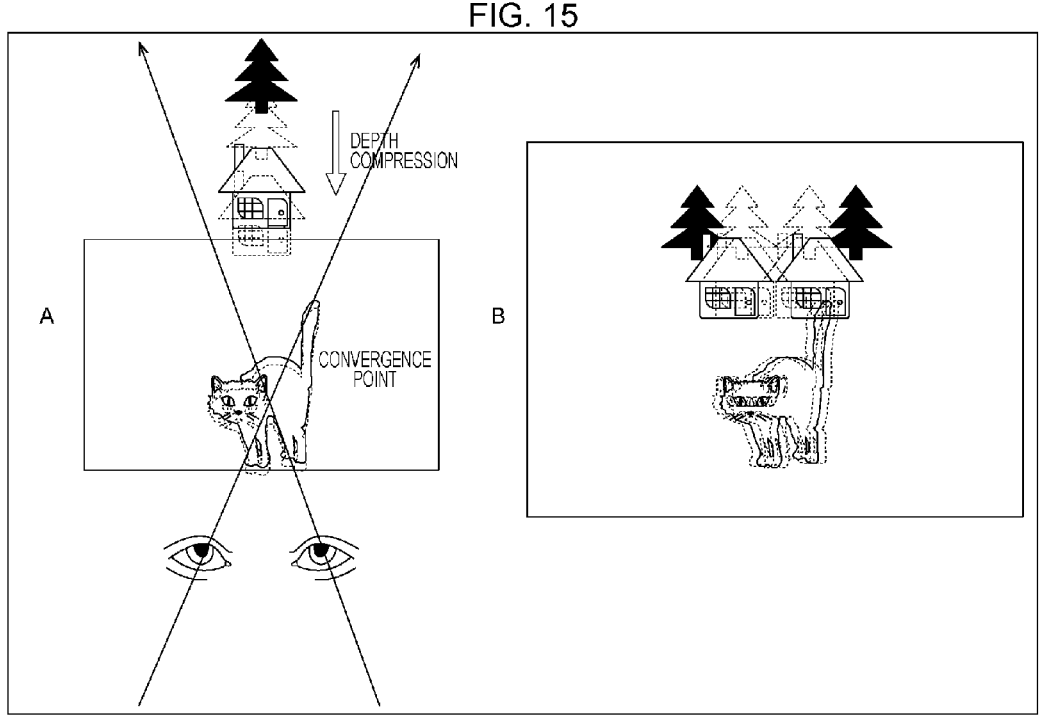
FIG. 15 is a diagram describing a second adjustment method for binocular disparity amount.

FIG. 14 is a diagram describing a first method to adjust first binocular disparity amount, and FIG. 15 is a diagram describing a second method to adjust second binocular disparity amount. Furthermore, in FIG. 14, part A of FIG. 14 illustrates the position of depth for the 3D image perceived by the viewer, and part B of FIG. 14 illustrates the image that is the result of combining the left image and the right image to configure the 3D image. This holds the same for FIG. 15 as well.

As shown in FIG. 14, the first adjustment method for first binocular disparity amount horizontally shifts the image for the left eye and the image for the right eye. In the example in FIG. 14, the binocular disparity amount is decreased by shifting image for the left eye in the right direction and shifting the image for the right eye in the left direction. This allows viewers to perceive the house, tree, and cat in the foreground more than before the binocular disparity amount had been adjusted.

Furthermore, as the first adjustment method shifts the image for the left eye and the image for the right eye, this causes the left-most edge and right-most edge of the image for the left eye and image for the right eye to be lost. Therefore, by enlarging the image for the left eye and image for the right eye, and inserting a predetermined image, the left-most edges and right-most edges are interpolated. Furthermore, when the image for the left eye and image for the right eye are enlarged, the binocular disparity amount changes, and so the image for the left eye and image for the right eye are shifted after consideration of this change.

As shown in FIG. 15, the second adjustment method for the binocular disparity amount generates a new image for the left eye and image for the right eye based on the image for the left eye and image for the right eye. This method not only changes the binocular disparity amount of 3D images, but can also compress the binocular disparity amount of 3D images.

Specifically, in the example in FIG. 15, the position of the house in the new image for the left eye is moved to the right from the position of the house in the original image for the left eye; the position of the tree is moved to the right from the position of the tree in the original image for the left eye, with the amount of movement being greater than that of the house; and the position of the cat is moved to the right from the position of the cat in the original image for the left eye, with the amount of movement being less than that of the house. Also, the position of the house in the new image for the right eye is moved to the left from the position of the house in the original image for the right eye; the position of the tree is moved to the left from the position of the tree in the original image for the right eye, with the amount of movement being greater than that of the house; and the position of the cat is moved to the left from the position of the cat in the original image for the right eye, with the amount of movement being less than that of the house. Therefore, the binocular disparity amount of 3D images is decreased and compressed at the same time. As a result, the viewer perceives the tree, house, and cat in the foreground more than before the binocular disparity amount had been adjusted, in the order or greater movement, i.e. tree, house, and cat. In other words, the viewer can perceive 3D images more in the foreground, as the position of depth is compressed more than before the binocular disparity amount had been adjusted.

[Description of Editing Device Processing]

Figure 16:
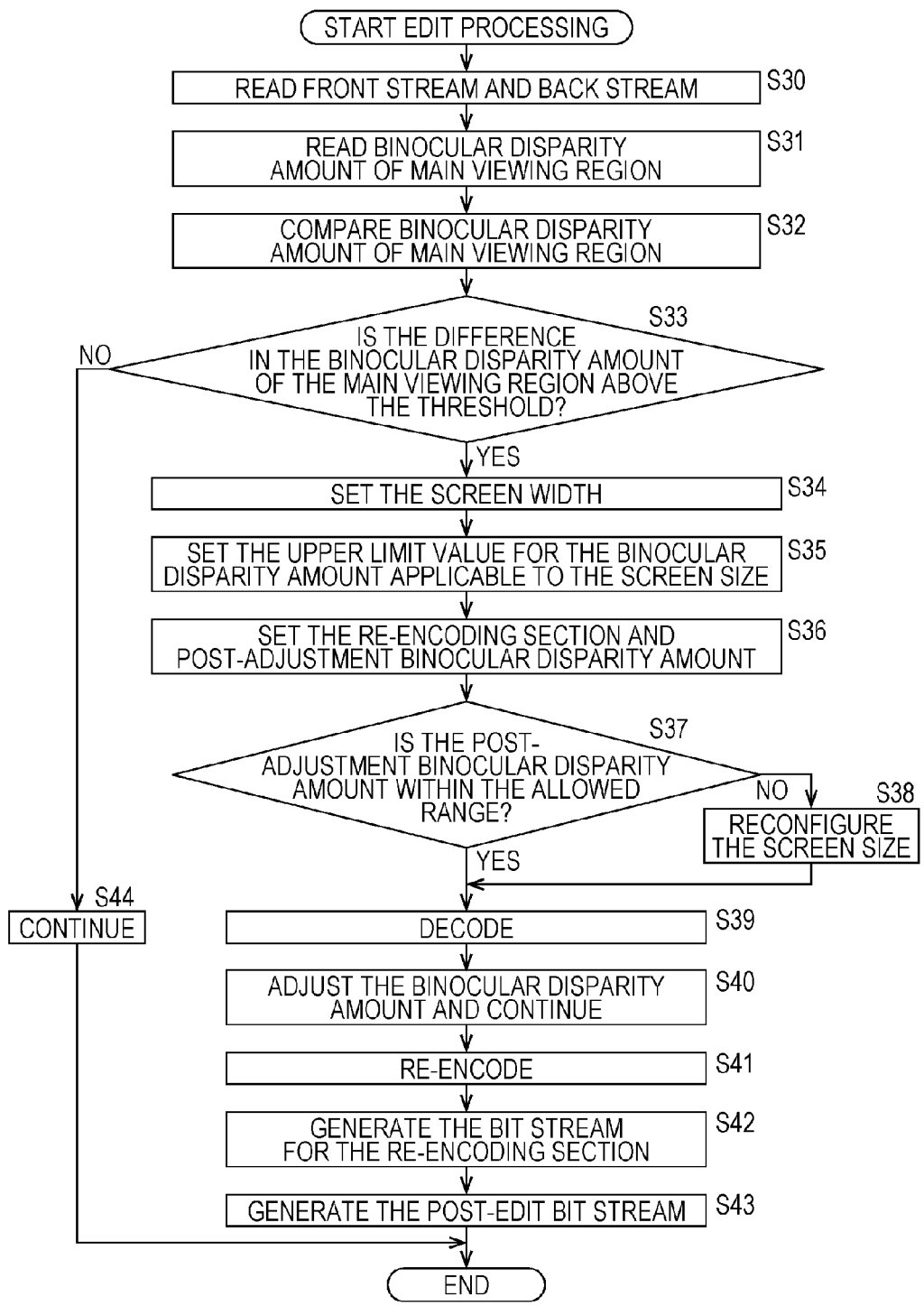
FIG. 16 is a flowchart describing editing processing by the editing device in FIG. 12.

FIG. 16 is a flowchart describing the editing process for the editing device 30 in FIG. 12. This editing process starts, for example, when the user instructs to start editing the bitstream that had been stored in the HDD 37 as editable material.

In step 30 in FIG. 16, based on CPU 41 control, the southbridge 36 reads the front stream and back stream from the HDD 37, based on operation input from the user, which are supplied from the operation input unit not shown in the figure. The front stream and back stream are supplied to the memory 39 to be stored, through the northbridge 32, the PCI bus 35, and the PCI bridge 38. Also, the CPU 31 supplies the information representing edit points and commands representing the edit start to the CPU 41, through the northbridge 32, the PCI bus 35, the PCI bridge 38, and the control bus 40.

In step 31, based on the information representing the edit point supplied from the CPU 31, the CPU 41 reads the binocular disparity amount for the main viewing region from the disparity information, which is included in the front stream and back stream stored in the memory 39 as the additional information.

In step 32, the CPU 41 compares the binocular disparity amount for the main viewing region of the front stream edit point to the binocular disparity amount for the main viewing region of the back stream edit point.

In step 33, the CPU 41 determines whether the difference between the binocular disparity amount for the main viewing region of the front stream edit point and the binocular disparity amount for the main viewing region of the back stream edit point is above a predetermined threshold. The predetermined threshold is, for example, the binocular disparity amount that corresponds to one degree of the convergence angle.

When the difference between the binocular disparity amount for the main viewing region of the front stream edit point and the binocular disparity amount for the main viewing region of the back stream edit point is determined to be above the predetermined threshold in step S33, processing proceeds to step S34. In step S34, based on the maximum screen width from the estimated viewing environment information included in the front stream and back stream as the additional information, the CPU 41 sets a width smaller than this maximum screen width.

In step S35, the CPU 41 determines the upper limit value for the binocular disparity amount corresponding with the screen width. Specifically, the CPU 41 performs a calculation by assigning the values for the horizontal resolution of the 3D images, the estimated distance between the eyes included in the estimated viewing environment information, and the screen width set in step S33 into the Expression (1) previously described, in which to determine the upper limit value for the binocular disparity amount corresponding with the screen width.

In step S36, the CPU 41 determines the re-encoding section and the binocular disparity amount after adjusting the re-encoding section, based on the information representing the edit point supplied from the CPU 31 and the disparity information included in the front stream and back stream.

In step S37, the CPU 41 determines whether the binocular disparity amount after adjusting the re-encoding section is within the acceptable range, i.e. at or below the upper limit value for the binocular disparity amount determined in step S35.

When the binocular disparity amount after adjusting the re-encoding section is determined to be within an acceptable range at step S37, based on CPU 41 control, the PCI bridge 38 selects the encoded data in the re-encoding section and the encoded data necessary to decode this encoded data from the front stream stored in memory 39, and supplies this to the decoder 43. Also, based on CPU 41 control, the PCI bridge 38 selects the encoded data in the re-encoding section and the encoded data to be necessary to decode this encoded data from the back stream stored in memory 39, and supplies this to the decoder 44. Also, based on CPU 41 control, the PCI bridge 38 supplies to the stream splicer 46 the part of the front stream up to the edit point that is not in the re-encoding section, and the part of the back stream after the edit point that is not in the re-encoding section, both of which are stored in the memory 39. Processing then proceeds to step S39.

In contrast, if the binocular disparity amount after adjusting the re-encoding section is determined to not be within the acceptable range at step S37, the CPU 41 reconfigures the screen width in step S38.

Specifically, an example of the relationship between the screen width obtained with Expression (1) previously described and the upper limit for the binocular disparity amount is shown in FIG. 17. Furthermore, the horizontal resolution of 3D images in FIG. 17 is 1920 pixels. As shown in FIG. 17, the smaller the screen width, the larger the upper limit for the binocular disparity amount. Therefore, the CPU 41 decreases the screen width estimated by the user so that the binocular disparity amount after adjusting the re-encoding section will be within the acceptable range.

Next, based on CPU 41 control, the PCI bridge 38 supplies the encoded data in the re-encoding section and the encoded data necessary to decode this encoded data, from the front stream stored in the memory 39 to the decoder 43. Also, based on CPU 41 control, the PCI bridge 38 supplies the encoded data in the re-encoding section and the encoded data necessary to decode this encoded data, from the back stream stored in memory 39 to the decoder 44. Also, based on CPU 41 control, the PCI bridge 38 supplies to the stream splicer 46 the part of the front stream up to the edit point that is not in the re-encoding section, and the part of the back stream after the edit point that is not in the re-encoding section, both of which are stored in the memory 39. Processing then proceeds to step S39.

In step S39, based on CPU 41 control, the decoder 43 and the decoder 44 decode the encoded data supplied from PCI bridge 38 using a format compatible with the encoding format used by the encoder 12 in FIG. 2. The decoder 43 and the decoder 44 then supply the image data of 3D images obtained as a result of the decoding to the editing unit 47.

In step S40, based on CPU 41 control, the editing unit 47 adjusts the binocular disparity amount for the main viewing region in the image data of 3D images supplied from the decoder 43 and the decoder 44, based on the binocular disparity amount after adjusting the re-encoding section determined at step S36, and connects the post-adjustment image data. The editing unit 47 supplies the image data of 3D images obtained as a result to encoder 48 as post-edit data.

In step S41, based on CPU 41 control, encoder 48 re-encodes the post-edit data supplied from the editing unit 47. The encoder 48 supplies the encoded data obtained as a result to the stream splicer 46.

In step S42, based on CPU 41 control, the stream splicer 46 adds the updated additional information to the encoded data supplied from encoder 48 and to the binocular disparity amount for the main viewing region after adjustment, and then generates the bitstream for the re-encoding section. Furthermore, when the processing of step S38 is performed, the maximum screen width in the additional information is updated with the screen width reconfigured at step S38.

In step S43, based on CPU 41 control, the stream splicer 46 connects the generated bitstream of the re-encoding section and the bitstream supplied from the PCI bridge 38, and generates the post-edit bitstream.

In contrast, in step 33, when the difference between the binocular disparity amount for the main viewing region of the edit point in the front stream and the binocular disparity amount for the main viewing region of the edit point in the back stream is not over a predetermined threshold, based on CPU 41 control, the PCI bridge 38 supplies the front stream up to the edit point and the back stream after the edit point, both of which are stored in memory 39, to the stream splicer 46. Then, in step S44, based on CPU 41 control, the stream splicer 46 connects the front stream up to the edit point and the back stream after the edit point, both supplied from the PCI bridge 38, and generates the post-edit bitstream.

The post-edit bitstream is stored in the memory 39, and decoded by the decoder 45. The post-edit bitstream stored the in memory 39 is supplied to the HDD 37 to be stored, according to user instruction. Also, the image data obtained as a result from decoding by the decoder 45 is output to a display or similar not shown in the figure, and the resultant 3D images are displayed.

As previously described, the editing unit 30 obtains at least the bitstream that includes the disparity information and encoded data, and sets the playback timing of the 3D images corresponding to this encoded data, determines the re-encoding section based on the disparity information, and adjusts the binocular disparity amount of 3D images in the re-encoding section. In this way, the editing unit 30 can generate 3D images that can be viewed safely and comfortably, by assuring that the difference between the binocular disparity amount of 3D images with continuous playback are at or below a predetermined threshold.

Also, as the encoded data and disparity information are both included in the bitstream, the editing device 30 does not have to decode the encoded data to obtain the disparity information. Therefore, the editing unit 30 can generate 3D images that can be viewed safely and comfortably by only decoding the re-encoding section needed to assure that the difference in the binocular disparity amount of 3D images of which the timings of playback are consecutive is at or below a predetermined threshold. As a result, the editing device 30 can provide safe and comfortable 3D images to the viewer without much of an image processing load.

Furthermore, the acceptable range in step S37 of FIG. 16 is the range compatible with the shooting condition information, i.e. the range of binocular disparity amount that is more than the lower limit value and less than the upper limit value. Also, when the post-adjustment binocular disparity amount is not within the acceptable range, the editing device 30 applies a fade out to the image data corresponding to the front stream, and apply a fade in to the image data corresponding to the back stream, which enables the difference in the binocular disparity amount at the edit point to be difficult for the viewer to perceive.

Also, when position information of the binocular disparity amount for the main viewing region is included as disparity information, the editing unit 30 obtains the difference between the main viewing region at the edit point of the front stream and the main viewing region at the edit point of the back stream, based on this position information, and when this distance is large, adjustment of the binocular disparity amount does not have to be performed.

Furthermore, as estimated viewing environment information, a range of binocular disparity amount that allows safe and comfortable viewing in the viewing environment estimated by the user can be added instead of the maximum screen size and estimated distance between the eyes. In this case, this range of binocular disparity amounts becomes the acceptable range in step S37.

Also, as previously described, the editing unit 30 has adjusted the binocular disparity amount so that the difference in the binocular disparity amount for the main viewing region of 3D images of which the timings of playback are consecutive is within range of a predetermined threshold, but an adjustment of the binocular disparity amount can also be performed where the maximum binocular disparity amount, minimum binocular disparity amount for 3D images of which the timings of playback are consecutive, or intermediate values for the maximum binocular disparity amount and minimum binocular disparity amount is within a predetermined range.

Furthermore, the device that uses the additional information included in the bitstream sent by the shooting device 10 can be a playback device that performs special playback of a bitstream with discontinuous shooting timing (for example, highlight playback, digest playback, skip playback, repeat playback, continuous playback of 3D images shot with discontinuous shooting timing, and others), in addition to the editing device 30 that edits the bitstream.

Also, the encoded data included in the bitstream transmitted from the shooting device 10 can be either encoded data of moving pictures or encoded data of still pictures. When the encoded data included in the bitstream transmitted from the shooting device 10 is encoded data of still pictures, the device that uses the additional information included in the bitstream can perform a slideshow display, for example.

Also, with the present embodiment, the additional information has been added (written) into the encoded data, but the additional information can be transmitted (recorded) separate from the image data (or bitstream). Also, the additional information can be linked with the image data (or bitstream).

Furthermore, with the present embodiment, the term "link" is defined as follows. "Link" indicates the state where image data (or bitstream) and the additional information is linked to each other. The image data to be linked with the additional information can be transmitted using a separate transmission path. Also, the image data (or bitstream) to be linked with the additional information can each be recorded on separate recoding media (or on different recording areas within the same recording medium). Furthermore, the unit of measure to link image data (or bitstream) to be linked with the additional information can be, for example, the encoded data processing unit (one frame, multiple frames, or the like).

[Description of Computer with the Present Technology Applied]

Next, the series of processing previously described can be performed in hardware, or in software. When the series of processing is performed in software, the program that configures this software is installed on a general-purpose computer or similar.

Figure 18:
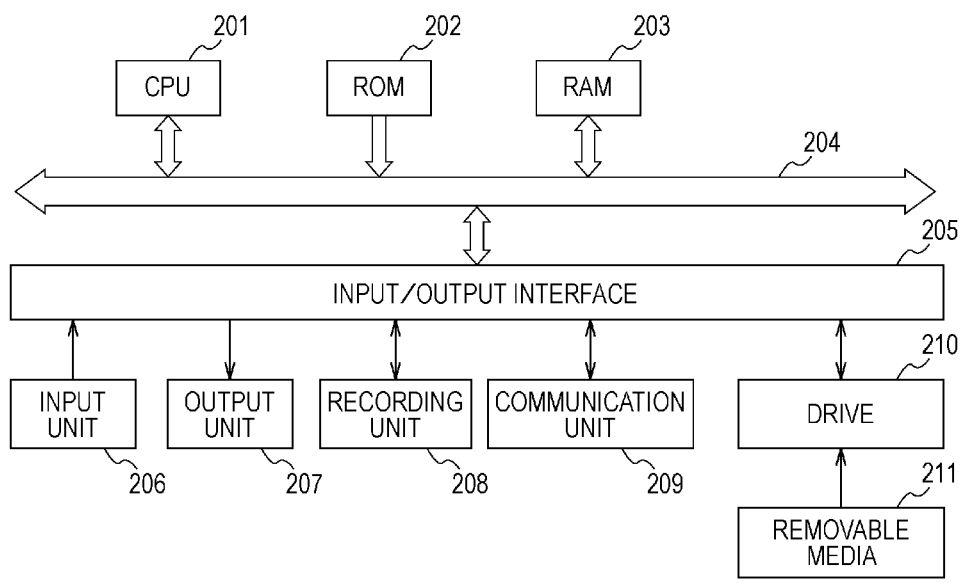
FIG. 18 is a diagram illustrating an example configuration of an embodiment of a computer.

FIG. 18 is a diagram illustrating an example configuration of an embodiment of a computer to which the program that executes series of processing described previously has been installed.

The program can be recorded beforehand in a recording unit 208 or ROM (Read Only Memory) 202, which is the recording medium installed in the computer.

The program can also be stored (recorded) on removable media 211. This kind of removable media 211 can be provided as packaged software. Here, examples of the removable media include a flexible disk, CD-ROM (Compact Disc Read Only Memory), MO (Magneto Optical) disk, DVD (Digital Versatile Disc), magnetic disk, semiconductor memory, and so forth.

Furthermore, besides being installed on a computer from the removable media 211 previously described through the drive 210, the program can be downloaded to the computer through a communication network or broadcast network, and then installed to the recording unit 208, which is built into the computer. That is to say, for example, the program can be transferred from a download site to the computer wirelessly through a satellite used for digital satellite broadcasting, or can be transferred to a computer connected to a LAN (Local Area Network) via a wired connection through a network such as the Internet.

The computer has a CPU (Central Processing Unit) 201 built in, and the CPU 201 connects with an input output interface 205 through a bus 204.

When instruction is input into an input unit 206 by user operation or the like through the input output interface 205, the CPU 201 executes the program stored in the ROM 202 in accordance. Alternatively, the CPU 201 loads the program stored in the recording unit 208 to the RAM (Random Access Memory) 203, and then executes the program.

With this, the CPU 201 performs the processing according the previously described flowchart, or according to the configuration in the block diagram. The CPU 201 then outputs the processing result from the output unit 207 through the input output interface 205, transmits from the communication unit 209, further records to the recording unit 208, or the like, for example, as necessary.

Furthermore, input unit 206 is configured of a keyboard, a mouse, a microphone, and the like. Also, output unit 207 is configured of an LCD (Liquid Crystal Display), a speaker, and the like.

Here, according to the present specification, the processing performed by the computer according to the program does not have to be performed in the time sequence of the order described in the flowcharts. That is to say, the processing performed by the computer according to the program also includes processing executed in parallel or individually (for example, parallel processing or object processing).

Also, the processing of the program can be performed on one computer (processor), or distributed processing can be implemented on multiple computers. Also, the program can be transferred to a remote computer to be executed there.

The present technology can be configured as follows.

(1)

An image processing device, including:

an encoding unit that encodes 3D images and generates an encoded stream;

a setting unit that sets estimated viewing environment information, which includes disparity information that includes binocular disparity amount for a main viewing region for the 3D images, a maximum screen width estimated as a viewing environment for the 3D images, and an estimated distance between the eyes; and a transmission unit that transmits the encoded stream generated by the encoding unit, and the disparity information and estimated viewing environment information set by the setting unit.

(2)

The image processing device according to (1), wherein the setting unit further sets the shooting condition information, which includes an upper limit value for the binocular disparity amount;

and wherein the transmission unit also transmits the shooting condition information set by the setting unit.

(3)

The image processing device according to (1) or (2), wherein the disparity information includes position information representing the position of the 3D images corresponding to the binocular disparity amount.

(4)

The image processing device according to any of (1) through (3), wherein the disparity information includes the maximum binocular disparity amount that is the upper limit value for the binocular disparity amount, and the minimum binocular disparity amount that is the lower limit value for the binocular disparity amount.

(5)

The image processing device according to any of (1) through (4), wherein the disparity information includes identifier information that identifies whether or not the binocular disparity amount is valid.

(6)

An image processing method for an image processing device, including:

a decoding step that decodes 3D images and generates an encoded stream;

a setting step that sets estimated viewing environment information, which includes disparity information that includes binocular disparity amount for a main viewing region for the 3D images, a maximum screen width estimated as a viewing environment for the 3D images, and an estimated distance between the eyes; and a transmission step that transmits the encoded stream generated by the encoding unit, and the disparity information and estimated viewing environment information set by the setting unit.

(7)

An image processing device which, regarding editing, at an edit point, a first encoded stream which has a first 3D encoded image, and a second encoded 3D image which has a second encoded 3D image, includes:

an obtaining unit that obtains first disparity information, which includes binocular disparity amount for a main viewing region of the first 3D images that have been added to the first encoding stream, and obtains second disparity information, which includes the binocular disparity amount for a main viewing region of the second 3D images that have been added to the second encoding stream;

an adjustment unit that adjusts the binocular disparity amount for the first disparity information and the binocular disparity amount for the second disparity information, so that the difference between the binocular disparity amount included in the first disparity information obtained by the obtaining unit and the binocular disparity amount included in the second disparity information obtained by the obtaining unit, is at or below a threshold;

an updating unit that updates the binocular disparity amount included in the first disparity information obtained by the obtaining unit and the binocular disparity amount included in the second disparity information obtained by the obtaining unit, into the binocular disparity amount adjusted by the adjustment unit; and an editing unit that adds the first disparity information with the binocular disparity amount updated by the updating unit to the first encoded stream, or adds the second disparity information with the binocular disparity amount updated by the updating unit to the second encoded stream, and edits the first encoded stream and the second encoded stream at the edit point.

(8)

The image processing device according to (7) further including:

a setting unit that sets a predetermined range that includes the edit point set in the first encoded stream and a predetermined range that includes the edit point set in the second stream, as a re-encoding section which is a section regarding which adjusting of disparity is necessary, based on the binocular disparity amount included in the first disparity information obtained by the obtaining unit and on the binocular disparity amount included in the second disparity information obtained by the obtaining unit; and wherein the editing unit re-encodes the re-encoding section set by the setting unit for the first encoded stream and the second encoded stream.

(9)

The image processing device according to (8), wherein the editing unit further includes:

a decoding unit that decodes the re-encoding section of the first encoded stream and the re-encoding section of the second encoded stream; and an encoding unit that encodes edited 3D images obtained as a result of editing at the edit point the first 3D image and the second 3D image, of which both have been obtained as the decoding result from the decoding unit.

(10)

The image processing device according to (8) or (9), wherein the obtaining unit obtains a first estimated viewing environment information, which includes the maximum screen width estimated as the viewing environment for the first 3D image that has been added to the first encoded stream, and obtains a second estimated viewing environment information, which includes the maximum screen width estimated as the viewing environment for the second 3D image that has been added to the second encoded stream; and wherein the setting unit sets the re-encoding section, based on the first estimated viewing environment information obtained from the obtaining unit and on the second estimated viewing environment information obtained from the obtaining unit.

(11)

The image processing device according to (8) or (9) wherein the obtaining unit obtains the first shooting condition information that includes the upper limit value for the binocular disparity amount of the first 3D image that has been added to the first encoded stream, and obtains the second shooting condition information that includes the upper limit value for the binocular disparity amount of the second 3D image that has been added to the second encoded stream;

and wherein the setting unit sets the re-encoding section, based on the first shooting condition information obtained from the obtaining unit and on the second shooting condition information obtained from the obtaining unit.

(12)

An image processing method for an image processing device that edits, at an edit point, a first encoded stream which has a first 3D encoded image, and a second encoded 3D image which has a second encoded 3D image, including;

an obtaining step that obtains first disparity information which includes binocular disparity amount for a main viewing region of the first 3D images that have been added to the first encoded stream, and obtains second disparity information which includes the binocular disparity amount for a main viewing region of the second 3D images which have been added to the second encoded stream;

an adjusting step that adjusts the binocular disparity amount of the first disparity information, or adjusts the binocular disparity amount of the second disparity information, so that the difference between the binocular disparity amount included in the first disparity information obtained from processing of the obtaining step and the binocular disparity amount included in the second disparity information obtained from processing of the obtaining step is at or below a threshold;

an updating step that updates the binocular disparity amount included in the first disparity information obtained by processing of the obtaining step, or updates the binocular disparity amount included in the second disparity information obtained by processing of the obtaining step, into the binocular disparity amount adjusted by processing of the adjusting step; and an editing step that adds the first disparity information with the updated binocular disparity amount updated by processing of the updating step to the first encoded stream, or adds the second disparity information with the updated binocular disparity amount updated by processing of the updating step to the second encoded stream, and edits at the edit point the first encoded stream and the second encoded stream.

REFERENCE SIGNS LIST 10 shooting device
11 shooting unit
12 encoder
13 additional information generating unit
14 stream generating unit
30 editing device
31 CPU
34 communication unit
41 CPU
43 decoder
44 decoder
47 editing unit

The invention claimed is:

1. An image processing device configured to edit, at an edit point, a first encoded stream of 3D images, and a second encoded stream of 3D images, comprising:
an obtaining unit configured to obtain first disparity information, which includes a binocular disparity amount for a first main viewing region within the 3D images that are part of the first encoded stream, and configured to obtain second disparity information, which includes a binocular disparity amount for a second main viewing region within the 3D images that are part of the second encoded stream;
an adjustment unit configured to adjust at least one of the binocular disparity amount for the first disparity information of the first main viewing region and the binocular disparity amount for the second disparity information of the second main viewing region, so that the difference between the binocular disparity amount included in the first disparity information obtained by the obtaining unit and the binocular disparity amount included in the second disparity information obtained by the obtaining unit, is at or below a threshold;
an updating unit configured to update the binocular disparity amount included in the first disparity information obtained by the obtaining unit and the binocular disparity amount included in the second disparity information obtained by the obtaining unit, into the binocular disparity amount adjusted by the adjustment unit; and
an editing unit configured to add the first disparity information with the binocular disparity amount updated by the updating unit to the first encoded stream, or add the second disparity information with the binocular disparity amount updated by the updating unit to the second encoded stream, and configured to edit the first encoded stream and the second encoded stream at the edit point, and configured to re-encode a re-encoding section that includes at least a portion of the first encoded stream or the second encoded stream,
wherein the first main viewing region within the 3D images of the first encoded stream and the second main viewing region within the 3D images of the second encoded stream are between a foreground and a background of a frame of the 3D images.

2. The image processing device according to claim 1, further comprising:
a setting unit configured to set a predetermined range that includes the edit point in the first encoded stream and a predetermined range that includes the edit point in the second encoded stream, as the re-encoding section which is a section regarding which adjusting of disparity is necessary, based on the binocular disparity amount included in the first disparity information obtained by the obtaining unit and on the binocular disparity amount included in the second disparity information obtained by the obtaining unit;
wherein the editing unit is configured to re-encode the re-encoding section set by the setting unit for the first encoded stream and the second encoded stream.

3. The image processing device according to claim 2, the editing unit further comprising:
a decoding unit configured to decode the re-encoding section of the first encoded stream and the re-encoding section of the second encoded stream; and
an encoding unit configured to encode edited 3D images obtained as a result of editing at the edit point the first encoded stream and the second encoded stream, both of which have been obtained as the decoding result from the decoding unit.

4. The image processing device according to claim 2, wherein the obtaining unit obtains a first estimated viewing environment information that includes a first maximum screen width based on an estimated viewing environment for the first encoded stream, and obtains a second estimated viewing environment information that includes a second maximum screen width based on an estimated viewing environment for the second encoded stream; and
wherein the setting unit sets the re-encoding section, based on the first estimated viewing environment information obtained from the obtaining unit and on the second estimated viewing environment information obtained from the obtaining unit.

5. The image processing device according to claim 2, wherein the first disparity information includes a first upper limit value for a binocular disparity of the first encoded stream, and the second disparity information includes a second upper limit value for a binocular disparity of the second encoded stream;
and wherein the setting unit is configured to set the re-encoding section based on the first disparity information and the second disparity information.

6. An image processing method for an image processing device that edits, at an edit point, a first encoded stream which has a first encoded 3D image, and a second encoded stream which has a second encoded 3D image, comprising;
an obtaining step that obtains first disparity information, which includes a binocular disparity amount for a first main viewing region within the first encoded 3D image in the first encoded stream, and obtains second disparity information, which includes a binocular disparity amount for a second main viewing region within the second encoded 3D image in the second encoded stream;
an adjusting step that adjusts the binocular disparity amount of the first disparity information for the first main viewing region, or adjusts the binocular disparity amount of the second disparity information for the second main viewing region, so that the difference between the binocular disparity amount included in the first disparity information obtained from processing of the obtaining step and the binocular disparity amount included in the second disparity information obtained from processing of the obtaining step is at or below a threshold;

an updating step that updates the binocular disparity amount included in the first disparity information obtained by processing of the obtaining step, or updates the binocular disparity amount included in the second disparity information obtained by processing of the obtaining step, into the binocular disparity amount adjusted by processing of the adjusting step; and an editing step that adds the first disparity information with the updated binocular disparity amount updated by processing of the updating step to the first encoded stream, or adds the second disparity information with the updated binocular disparity amount updated by processing of the updating step to the second encoded stream, and edits at the edit point the first encoded stream and the second encoded stream, and re-encodes a re-encoding section that includes at least a portion of the first encoded stream or the second encoded stream, wherein the first main viewing region within the encoded 3D images of the first encoded stream and the first main viewing region within the encoded 3D images of the second encoded stream are between a foreground and a background of a frame of the encoded 3D images.

* * * * *